United States Patent
Lin et al.

(10) Patent No.: US 12,088,006 B1
(45) Date of Patent: Sep. 10, 2024

(54) LEAKY COAXIAL CABLE AND INDOOR DISTRIBUTION SYSTEM

(71) Applicants: ZHONGTIAN RADIO FREQUENCY CABLE CO., LTD., Nantong (CN); JIANGSU ZHONGTIAN TECHNOLOGY CO., LTD., Nantong (CN)

(72) Inventors: Longlong Lin, Nantong (CN); Ruijing Zhao, Nantong (CN); Bohua Xu, Nantong (CN); Yanrui Lan, Nantong (CN); Bin Wang, Nantong (CN); Min Sha, Nantong (CN); Baoqiang Pan, Nantong (CN); Zongming Xu, Nantong (CN)

(73) Assignees: ZHONGTIAN RADIO FREQUENCY CABLE CO., LTD., Nantong (CN); JIANGSU ZHONGTIAN TECHNOLOGY CO., LTD., Nantong (CN)

( * ) Notice: Subject to any disclaimer, the term of this patent is extended or adjusted under 35 U.S.C. 154(b) by 109 days.

(21) Appl. No.: 17/971,962

(22) Filed: Oct. 24, 2022

Related U.S. Application Data

(63) Continuation of application No. PCT/CN2022/081541, filed on Mar. 17, 2022.

(30) Foreign Application Priority Data

May 10, 2021 (CN) .......................... 202110505568.9

(51) Int. Cl.
*H01Q 13/20* (2006.01)
*H04B 7/0413* (2017.01)

(52) U.S. Cl.
CPC ......... *H01Q 13/203* (2013.01); *H04B 7/0413* (2013.01)

(58) Field of Classification Search
CPC .................................................. H01Q 13/203
See application file for complete search history.

(56) References Cited

U.S. PATENT DOCUMENTS 4,197,549 A * 4/1980 Collins .............. H01Q 21/0062
343/791

FOREIGN PATENT DOCUMENTS

| CN | 101950838 A | 1/2011 |
|----|-------------|--------|
| CN | 103151591 A | 6/2013 |

(Continued)

OTHER PUBLICATIONS

International Search Report of PCT/CN2022/081541.

(Continued)

*Primary Examiner* — Graham P Smith
(74) *Attorney, Agent, or Firm* — J.C. PATENTS

(57) ABSTRACT

A leaky coaxial cable according to the present disclosure includes: an inner conductor, a first insulating dielectric layer, an intermediate conductor, a second insulating dielectric layer and an outer conductor arranged from the inside to the outside in proper order, where the inner conductor, the intermediate conductor and the outer conductor are coaxially arranged, periodically slotted holes are opened on several length segments of the outer conductor, the intermediate conductor and the outer conductor construct a leaky transmission channel, and the inner conductor and the intermediate diate conductor construct a feeder transmission channel. The leaky coaxial cable according to the present disclosure integrates feeder transmission and leaky transmission to have a dual-mode transmission characteristic, and may be used to solve a problem that system capacity cannot be increased when signal coverage is carried out indoors. The present disclosure further provides an indoor distribution system using the above leaky coaxial cable.

12 Claims, 2 Drawing Sheets

(56) References Cited

FOREIGN PATENT DOCUMENTS

| | | |
|---|---|---|
| CN | 108808255 A | 11/2018 |
| CN | 112993582 A | 6/2021 |
| JP | 2005244759 A | 9/2005 |

OTHER PUBLICATIONS

First Office Action of the priority application CN202110505568.9.
Second Office Action of the priority application CN202110505568.9.
Notice of Allowance of the priority application CN202110505568.9.

* cited by examiner

LEAKY COAXIAL CABLE AND INDOOR DISTRIBUTION SYSTEM

CROSS-REFERENCE TO RELATED APPLICATIONS

This disclosure is a continuation of International Application No. PCT/CN2022/081541, filed on Mar. 17, 2022, which claims priority to Chinese Patent Application No. 202110505568.9, filed on May 10, 2021. The disclosures of the aforementioned applications are hereby incorporated by reference in their entireties.

TECHNICAL FIELD

The present disclosure relates to the field of communication technologies and, in particular, to a leaky coaxial cable and an indoor distribution system.

BACKGROUND

Statistics show that more than 80% of services in current 4G mobile networks occur in indoor scenarios. With a continuous increase of 5G service types and a continuous expansion of industry boundaries, according to the prediction of the industry, more than 85% of mobile services will occur in indoor scenarios in the future. Therefore, operators' indoor mobile network capacity is crucial and is one of core competencies in the 5G era. More and more 5G mobile new services such as the mobile Internet, the Internet of things, high-definition videos, AR/VR (augmented reality/virtual reality) have put forward rigid demands on a network, such as large bandwidth and high capacity. In order to improve network capacity, MIMO technology is born on demand.

At present, an antenna-feeder distribution system is the most widely used indoor distribution system. However, all the existing antenna-feeder systems adopt single output, which cannot achieve MIMO effects and increase network capacity. In order to achieve the MIMO effects, it is necessary to add a multi-channel antenna-feeder system. The multi-channel antenna-feeder system greatly increases the construction difficulty, which not only doubles the construction time, but also puts forward more stringent requirements for installation space and environment.

SUMMARY

In view of the above, it is necessary to provide an improved leaky coaxial cable and an indoor distribution system using the same.

The technical solution provided by the present disclosure is: a leaky coaxial cable, including: an inner conductor, a first insulating dielectric layer, an intermediate conductor, a second insulating dielectric layer and an outer conductor arranged from the inside to the outside in proper order, where the inner conductor, the intermediate conductor and the outer conductor are coaxially arranged, periodically slotted holes are opened on several length segments of the outer conductor, the intermediate conductor and the outer conductor construct a leaky transmission channel, and the inner conductor and the intermediate conductor construct a feeder transmission channel.

Further, the periodically slotted holes are opened on the entire outer conductor, or the periodically slotted holes are opened on the outer conductor at intervals, or different periodically slotted holes are opened on the outer conductor at intervals.

Further, the inner conductor is hollow or solid.

Further, a ratio of an inner diameter of the outer conductor to an outer diameter of the intermediate conductor is a, and a ratio of an inner diameter of the intermediate conductor to an outer diameter of the inner conductor is b, where $1.5 \leq a \leq 20$, $1.5 \leq b \leq 20$.

Further, a protective sheath is arranged on an outside of the outer conductor, and an inner diameter of the outer conductor is 9 mm~50 mm.

The present disclosure further provides an indoor distribution system, including a multi-channel signal source at an end of the system, a terminal antenna at another end of the system, and the leaky coaxial cable connecting the multi-channel signal source and the terminal antenna, where the multi-channel signal source includes a first signal and a second signal, which are connected to the leaky coaxial cable for transmission, the terminal antenna is connected at an end of the leaky coaxial cable remote from the multi-channel signal source, the terminal antenna is a dual polarization antenna; the feeder transmission channel constructed in the leaky coaxial cable enables transmission or reception of the first signal through the terminal antenna: the leaky transmission channel constructed in the leaky coaxial cable transmits with the terminal antenna as a load, and enables transmission or reception of the second signal through the slotted holes and the terminal antenna, the first signal and the second signal pass through the feeder transmission channel and the leaky transmission channel respectively for indoor multiple input multiple output.

Further, the indoor distribution system includes two or more leaky coaxial cables connected in parallel and/or in series, and several terminal antennas connected remote from the multi-channel signal source.

Further, when the slotted holes opened on the two or more leaky coaxial cables are of a same polarization and the two or more leaky coaxial cables transmit a same signal side by side, a distance between two adjacent leaky coaxial cables is at least 10 cm.

Further, when the slotted holes opened on the two or more leaky coaxial cables are of different polarizations, the two leaky coaxial cables are capable of being integrated into one sheath.

Further, two or more feeder transmission channels are connected through a first power divider/coupler: two or more leaky transmission channels are connected through a jumper wire or a second power divider/coupler.

Further, the first power divider/coupler is connected with an antenna, the feeder transmission channel near the multi-channel signal source side transmits or receives the first signal through the antenna.

Further, the multi-channel signal source is connected to several combiners, each combiner is connected to a coupler, and each coupler is connected to the leaky coaxial cable.

Compared with the prior art, the leaky coaxial cable according to the present disclosure integrates feeder transmission and leaky transmission to have a dual-mode transmission characteristic so that application of the leaky coaxial cable is broadened in multiple input and multiple output of indoor signals and costs of indoor construction can be reduced, and may be used to solve a problem that system capacity cannot be increased when signal coverage is carried out indoors. At the same time, the leaky coaxial cable may also be transmitted in a plurality of different systems to avoid mutual interference between the plurality of systems.

Figure 1:
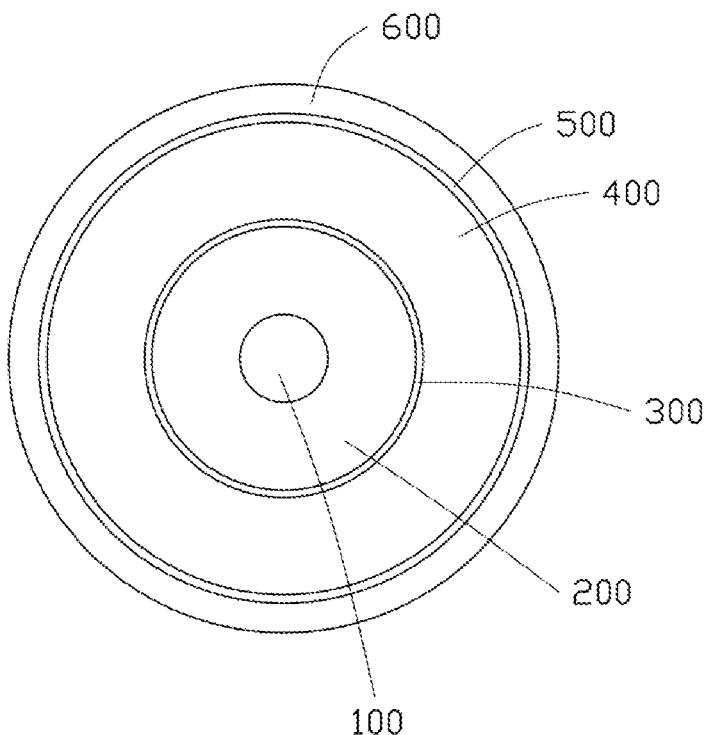
FIG. 1 is a schematic structural diagram of a cross-section of a leaky coaxial cable according to an embodiment of the present disclosure.

Symbol description of main components:
Leaky coaxial cable 10
Inner conductor 100
First insulating dielectric layer 200
Intermediate conductor 300
Second insulating dielectric layer 400
Outer conductor 500
Slotted hole 501
Sheath 600
Signal source 00
Combiner 07a, 07b
Coupler 08
First coupler 08a
Second coupler 08b
Terminal antenna 02
First terminal antenna 02a
Second terminal antenna 02b
Third terminal antenna 02c
Fourth terminal antenna 02d
Antenna 05
First antenna 05a
Second antenna 05b
First power divider/coupler 03
First power divider/coupler I 03a
First power divider/coupler II 03b
First power divider/coupler III 03c
First power divider/coupler IV 03d
Second power divider/coupler 04
Second power divider/coupler I 04a
Second power divider/coupler II 04b
Jumper wire 06
First jumper wire 06a
Second jumper wire 06b
First leaky coaxial cable 10a
Second leaky coaxial cable 10b
Third leaky coaxial cable 10c
Fourth leaky coaxial cable 10c
Fifth leaky coaxial cable 10e
Sixth leaky coaxial cable 10f
Seventh leaky coaxial cable 10g
Eighth leaky coaxial cable 10h The following specific embodiments will further explain the embodiments of the present disclosure in combination with the above drawings.

DESCRIPTION OF EMBODIMENTS

In order to be able to understand the above objects, features and advantages of the embodiments of the present disclosure more clearly, the present disclosure will be described in detail below with reference to the accompanying drawings and specific embodiments. It should be noted that the features in the embodiments of the present disclosure may be combined with each other in case of no conflict.

Many specific details are set forth in the following description to facilitate full understanding of the embodiments of the present disclosure. The described embodiments are only part of the embodiments of the present disclosure, not all of the embodiments. Based on the embodiments of the present disclosure, all other embodiments obtained by those ordinarily skilled in the art without any creative effort fall into the protection scope of the embodiments of the present disclosure.

Unless otherwise defined, all technical and scientific terms used herein have the same meanings as those generally understood by those skilled in the technical field belonging to the embodiments of the present disclosure. The terms used in the description of the present disclosure herein are only for a purpose of describing specific embodiments and are not intended to limit the embodiments of the present disclosure.

Referring to FIG. 1, the present disclosure provides a leaky coaxial cable 10, including an inner conductor 100, a first insulating dielectric layer 200, an intermediate conductor 300, a second insulating dielectric layer 400, an outer conductor 500 and a sheath 600 arranged from the inside to the outside in proper order, where the inner conductor 100, the intermediate conductor 300 and the outer conductor 500 are coaxially arranged, and periodically slotted holes 501 are opened on several length segments of the outer conductor 500, the intermediate conductor 300 and the outer conductor 500 construct a leaky transmission channel, and the inner conductor 100 and the intermediate conductor 300 construct a feeder transmission channel. A ratio of an inner diameter of the outer conductor 500 to an outer diameter of the intermediate conductor 300 is a, a ratio of an inner diameter of the intermediate conductor 300 to an outer diameter of the inner conductor 100 is b, where $1.5 \leq a \leq 20$, $1.5 \leq b \leq 20$, the inner diameter of the outer conductor 500 is 9 mm~50 mm. In this specific embodiment, a is 2.45, b is 2.53, and the inner diameter of the outer conductor 500 is 22 mm. The leaky coaxial cable 10 integrates feeder transmission and leaky transmission to have a dual-mode transmission characteristic so that application of the leaky coaxial cable 10 is broadened in multiple input and multiple output of indoor signals and costs of indoor construction can be reduced.

In a specific embodiment, the slotted hole 501 includes, but is not limited to, one or a combination of a fissile shape, a strip shape, a T-shape, a flared shape, an E-shape and a U-shape. Taking the strip shape as an example, the so-called combination may be a slotted hole in a format formed from arrangement of a plurality of strip-shaped linear arrays, or a slotted hole in a format formed from arrangement of a plurality of rows of strip-shaped linear arrays, and the like. The combination may also be a slotted hole in a format formed from the strip shape and the T-shape, or a slotted hole in a format of a deformed structure formed by overlapping the strip shape and the U-shape, or a slotted hole in a format of a group of strip-shaped slotted holes and a group of flare-shaped slotted holes, or other similar or possible formats. The fissile-shaped slotted hole refers to the original single slotted hole splitting into a plurality of staggered slotted holes at the same position.

Figure 2:
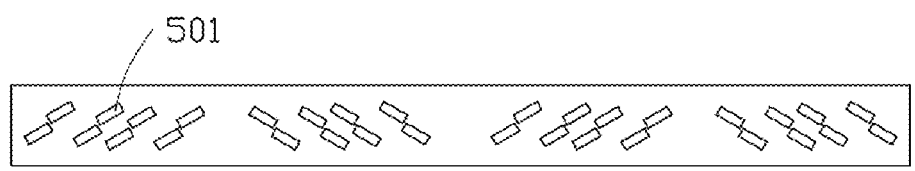
FIG. 2 is a schematic structural diagram of an outer conductor according to an embodiment of the present disclosure.

Referring to FIG. 2, in a specific embodiment, periodically slotted holes 501 are opened on the entire outer conductor 500, or periodically slotted holes 501 are opened on the outer conductor 500 at intervals, or different periodically slotted holes 501 are opened on the outer conductor 500 at intervals. In other words, the periodically slotted holes 501 may be integrally formed on the outer conductor 500, or may be formed on some length segments: a plurality of length segments may be arranged at intervals or irregularly, and a plurality of periodically slotted holes 501 may have a same slotted hole form or different slotted hole forms, depending on requirements for application scenarios, which is not limited to a certain specific structural form.

In a specific embodiment, the inner conductor 100 is hollow or solid, which depends on requirements for application scenarios, and does not need to be limited to a certain specific structural form.

In other embodiments, the sheath 600 mainly protects an internal structure of the leaky coaxial cable 10, e.g., mechanical protection such as shock resistance, resistant to water vapor, acid, alkali and other environmental and climatic erosion, electric shock safety, and the like. Under ideal environmental conditions, the sheath 600 layer may not be included in theory: under actual use conditions, the sheath layer is usually necessary. In a specific embodiment, the first insulating dielectric layer 200 and the second insulating dielectric layer 400 are used to insulate, fill and support the adjacent coaxially arranged conductors, generally, the material may be foamed polyethylene, polytetrafluoroethylene, etc.

The present disclosure also provides an indoor distribution system, including a multi-channel signal source 00 at an end of the system, a terminal antenna 02 at another end of the system, and the leaky coaxial cable 10 connecting the multi-channel signal source 00 and the terminal antenna 02, where the multi-channel signal source 00 includes a first signal and a second signal, which are connected to the leaky coaxial cable 10 for transmission, the terminal antenna 02 is connected at an end of the leaky coaxial cable 10 remote from the multi-channel signal source 00, the terminal antenna 02 is a dual polarization antenna: the feeder transmission channel constructed in the leaky coaxial cable 10 enables transmission or reception of the first signal through the terminal antenna 02: the leaky transmission channel constructed in the leakage coaxial cable 10 transmits with the terminal antenna 02 as a load, and enables transmission or reception of the second signal through the slotted holes 501 and the terminal antenna 02, the first signal and the second signal pass through the feeder transmission channel and the leaky transmission channel respectively for indoor multiple input multiple output.

A principle of the system for the multiple input multiple output is: the triax-based leaky coaxial cable 10 has the leaky transmission channel and the feeder transmission channel, and a leaky cable-load transmission technology is combined with an antenna-feeder system transmission technology to realize the input, transmission, coverage and interaction of multi-channel signals.

Specifically, taking the multi-channel signal source 00 including the first signal and the second signal as an example, the multi-channel signal source 00 is connected to a connector at an initial end of a leaky coaxial cable 10 by a jumper wire, a connector at a tail end of the leaky coaxial cable 10 is connected to the terminal antenna 02 by a jumper wire. The terminal antenna 02 and the feeder transmission channel construct an antenna-feeder system, the feeder transmission channel enables transmission of the first signal to realize information transfer of the components of both ends; the terminal antenna 02 is used to transmit the first signal, i.e., allowing for indoor coverage of the first signal input by the multi-channel signal source 00, so that an indoor terminal (such as a mobile phone, a computer, a radio frequency component, or the like) receives corresponding information; the terminal antenna 02 is also used to receive the first signal, i.e., receive the first signal transmitted from the indoor terminal, and feed back and transmit back to the multi-channel signal source 00, and then interact with an outdoor base station or an external server. Meanwhile, the leaky transmission channel and the terminal antenna 02 construct a leaky cable-load transmission system, the leaky transmission channel enables transmission of the second signal and indoor coverage of the second signal through the periodically slotted holes 501 of the outer conductor 500 and the terminal antenna 02: the periodically slotted holes 501 of the outer conductor 500 and the terminal antenna 02 may be used to receive the second signal, i.e., receive and feedback the second signal transmitted from the indoor terminal, and transmit back to the multi-channel signal source 00 through the leaky transmission channel, and then interact with an outdoor base station or an external server. In this way, the first signal and the second signal of double input can cover the same room at the same time, realizing 2×2MIMO. Of course, the system can also receive and transmit the first signal and the second signal from the same room respectively, and feedback to a base station (external server), so as to realize an interaction between the indoor terminal and the base station.

In a complicated indoor environment, the indoor distribution system includes two or more leaky coaxial cables 10 connected in parallel and/or in series, and several terminal antennas 02 connected remote from the multi-channel signal source. The specific embodiments of indoor signal coverage will be illustrated below for different combinations of connection manners.

In a first implementation, the system includes a multi-channel signal source 00, a first leaky coaxial cable 10a, a first terminal antenna 02a, a second leaky coaxial cable 10b, and a second terminal antenna 02b. In this embodiment, the multi-channel signal source 00 uses two jumper wires to connect the first leaky coaxial cable 10a and the second leaky coaxial cable 10b respectively, an end of the first leaky coaxial cable 10a is connected to the first terminal antenna 02a, a first signal is input to a feeder transmission channel of the first leaky coaxial cable 10a, and is transmitted by the first terminal antenna 02a and covered indoors: a second signal is input into a leaky transmission channel of the first leaky coaxial cable 10a, and is transmitted through periodically slotted holes on an outer conductor of the first leaky coaxial cable 10a and the first terminal antenna 02a with the first terminal antenna 02a as a load and covered indoors. An end of the second leaky coaxial cable 10b is connected to the second terminal antenna 02b; a third signal is input into the feeder transmission channel of the second leaky coaxial cable 10b, and is transmitted by the second terminal antenna 02b and covered indoors; a fourth signal is input into the leaky transmission channel of the second leaky coaxial cable 10b, and is transmitted through the periodically slotted holes on the outer conductor of the second leaky coaxial cable 10b and the second terminal antenna 02b with the second terminal antenna 02b as the load and covered indoors. In this embodiment, the system is designed with two leaky coaxial cables 10 connected in parallel to realize 4×4MIMO.

In a second implementation, the system includes a multi-channel signal source 00, a first leaky coaxial cable 10a, a first power divider/coupler 03, a second leaky coaxial cable 10b, a terminal antenna 02, and an antenna 05 connected to the first power divider/coupler 03. In this embodiment, the multi-channel signal source 00, a feeder transmission channel of the first leaky coaxial cable 10a, the first power divider/coupler 03, a feeder transmission channel of the second leaky coaxial cable 10b, and the terminal antenna 02 are sequentially connected to transmit a first signal, where the first power divider/coupler 03 is connected to the antenna 05: here, the antenna/the feeder transmission channel of the first leaky coaxial cable enables transmission and coverage of the first signal through the antenna 05, the terminal antenna/the feeder transmission channel of the second leaky coaxial cable enables transmission and coverage of the first signal through the terminal antenna 02, and the first power divider/coupler 03 divides the first signal in accordance with power and configures them to different feeder transmission links. The multi-channel signal source 00, a leaky transmission channel of the first leaky coaxial cable 10a, a jumper wire 06, a leaky transmission channel of the second leaky coaxial cable 10b, and the terminal antenna 02 are sequentially connected to transmit a second signal; the second signal is transmitted and covered indoors through periodically slotted holes on an outer conductor of the first leaky coaxial cable 10a and periodically slotted holes on an outer conductor of the second leaky coaxial cable 10b and the terminal antenna 02. In this embodiment, the system is designed with two leaky coaxial cables 10 connected in series to realize 2×2 MIMO.

In a practical application, the indoor distribution system may be a combination form of more than three leaky coaxial cables 10, and its connection manner may be parallel, series or a series-parallel combination. Any 2N*2N MIMO combination may be realized based on the different numbers and different combination forms, and N is an integer greater than or equal to 1. When there is a higher indoor floor or there are a plurality of floors, the multi-channel signal source 00 also needs to be delivered to different floors and then specifically configured to each indoor space. At this time, the multi-channel signal source is connected to several combiners 07, each combiner 07 is connected to a coupler 08, and each coupler 08 is connected to the leaky coaxial cable 10. Here, the combiner 07 functions to integrate certain signals of different frequency bands into a one-channel signal, the combiner 07 may also split a one-channel signal into independent signal sources of a plurality of frequency bands: the coupler 08 divides or synthesizes a certain channel of signals in accordance with the power.

Figure 3:
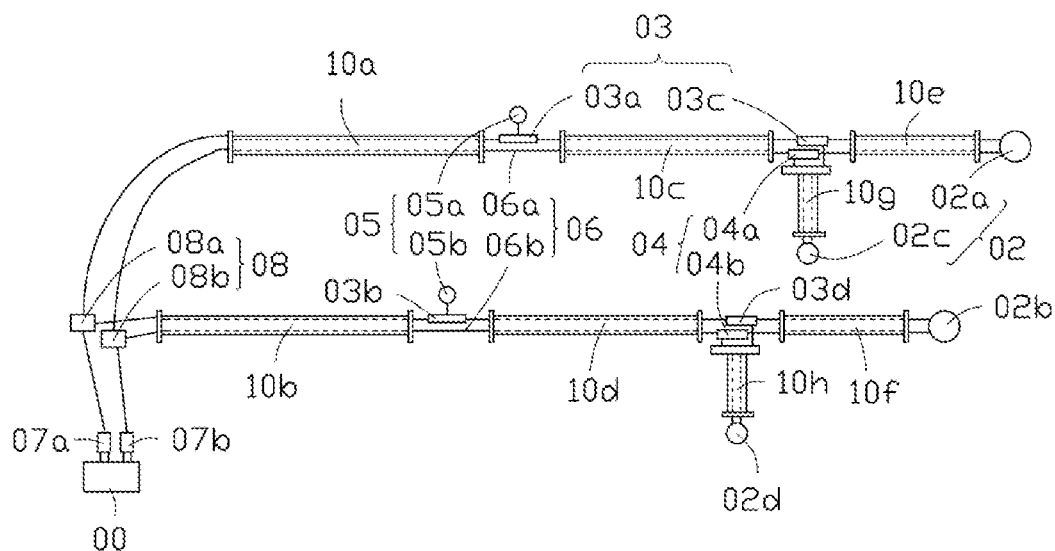
FIG. 3 is a schematic structural diagram of an indoor distribution system according to an embodiment of the present disclosure.

Referring to FIG. 3, as shown in the figure, the system includes a multi-channel signal source 00, a first signal is connected to a combiner 07a, a second signal is connected to a combiner 07b, the combiner 07a and the combiner 07b respectively connect the integrated first signal and a second signal to the first coupler 08a and the second coupler 08b. The first coupler 08a is connected to a feeder transmission channel of a first leaky coaxial cable 10a and a feeder transmission channel of a second leaky coaxial cable 10b respectively, and the second coupler 08b is connected to a leaky transmission channel of the first leaky coaxial cable 10a and a leaky transmission channel of the second leaky coaxial cable 10b respectively.

The feeder transmission channel of the first leaky coaxial cable 10a, a first power divider/coupler I 03a (connected with a first antenna 05a), the feeder transmission channel of a third leaky coaxial cable 10c, a first power divider/coupler III 03c, the feeder transmission channel of a fifth leaky coaxial cable 10e, and a first terminal antenna 02a are connected to transmit the first signal.

The leaky transmission channel of the first leaky coaxial cable 10a, a first jumper wire 06a, the leaky transmission channel of the third leaky coaxial cable 10c, a second power divider/coupler I 04a, the leaky transmission channel of a seventh leaky coaxial cable 10g, and a third terminal antenna 02c are connected to transmit the second signal: where the first power divider/coupler III 03c is connected to the feeder transmission channel of the seventh leaky coaxial cable 10g.

The feeder transmission channel of the second leaky coaxial cable 10b, a first power divider/coupler II 03b (connected with a second antenna 05b), the feeder transmission channel of a fourth leaky coaxial cable 10d, a first power divider/coupler IV 03d, the feeder transmission channel of a sixth leaky coaxial cable 10f, and a second terminal antenna 02b are connected to transmit the first signal.

The leaky transmission channel of the second leaky coaxial cable 10b, the second jumper wire 06b, the leaky transmission channel of the fourth leaky coaxial cable 10d, a second power divider/coupler II 03b, the leaky transmission channel of an eighth leaky coaxial cable 10h, and a fourth terminal antenna 02d are connected to transmit the second signal, where the first power divider/coupler IV 03d is connected to the feeder transmission channel of the eighth leaky coaxial cable 10h.

Above, the first coupler 08a divides the first signal S1 into S1-1 and S1-2. The first power divider/coupler I 03a divides the first signal S1-1 into S1-11 and S1-12 in accordance with power, S1-11 is covered by the first antenna 05a, S1-12 is divided into S1-12-1 and S1-12-2 in accordance with power by the first power divider/coupler III 03c, S1-12-1 and S1-12-2 are covered by the first terminal antenna 02a and the third terminal antenna 02c respectively. The first power divider/coupler II 03b divides the first signal S1-2 into S1-21 and S1-22 in accordance with power, S1-21 is covered by the second antenna 05b, S1-22 is divided into S1-22-1 and S1-22-2 in accordance with power by the first power divider/coupler IV 03d, S1-22-1 and S1-22-2 are covered by the second terminal antenna 02b and the fourth terminal antenna 02d respectively.

The second coupler 08b divides the second signal S2 into S2-1 and S2-2. S2-1 is covered by the periodically slotted holes on the outer conductor of the first leaky coaxial cable 10a and the periodically slotted holes on the outer conductor of the third leaky coaxial cable 10c: the second power divider/coupler I 04a divides S2-1 into S2-11 and S2-12 in accordance with power, S2-11 and S2-12 are covered by the periodically slotted holes on the outer conductor of the fifth leaky coaxial cable 10e and the first terminal antenna 02a and the periodically slotted holes on the outer conductor of the seventh leaky coaxial cable 10g and the third terminal antenna 02c. S2-2 is covered by the periodically slotted holes on the outer conductor of the second leaky coaxial cable 10b and the periodically slotted holes on the outer conductor of the fourth leaky coaxial cable 10d: the second power divider/coupler II 04b divides S2-2 into S2-21 and S2-22 in accordance with power, S2-21 and S2-22 are covered by the periodically slotted holes on the outer conductor of the sixth leaky coaxial cable 10f and the second terminal antenna 02b and the periodically slotted holes on the outer conductor of the eighth leaky coaxial cable 10h and the fourth terminal antenna 02d.

In this embodiment, both the first signal and the second signal of dual input are transmitted for indoor coverage to realize 2*2 MIMO.

Figure 4:
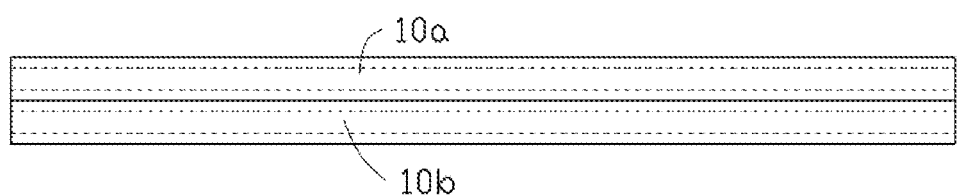
FIG. 4 is a schematic structural diagram of a leaky coaxial cable according to an embodiment of the present disclosure.

It should be noted that in the specific embodiment, when slotted holes 501 opened on the two or more leaky coaxial cables 10 are of a same polarization and the two or more leaky coaxial cables 10 transmit a same signal side by side, a minimum stagger distance between the two adjacent leaky coaxial cables 10 is 5 mm; when the slotted holes 501 opened on the two or more leaky coaxial cables 10 are of different polarizations, a minimum stagger distance between the two adjacent leaky coaxial cables 10 is 0 mm, and the two leaky coaxial cables 10 can also be integrated into a same sheath 600, as shown in FIG. 4.

In a practical application, most of them are 2N×2N MIMO form combined with the same or different feeding manners to achieve indoor signal coverage of a large area and a separated area.

In summary, the triaxial leaky coaxial cable according to the present disclosure has a dual-transmission mode, which lays a foundation for application of indoor multiple input multiple output technology so that the application of the leaky coaxial cable is broadened and using costs of the leaky coaxial cable are saved, and solves a problem that system capacity cannot be increased when signal coverage is carried out indoors. At the same time, the triaxial leaky coaxial cable may also be transmitted in a plurality of different systems to avoid mutual interference between the plurality of systems.

The above embodiments are only used to illustrate the technical solutions of the embodiments of the present disclosure, but not to limit them; although the embodiments of the present disclosure have been illustrated in detail with reference to the above preferred embodiments, those of ordinary skill in the art should understand that any modification or equivalent substitution of the technical solutions of the embodiments of the present disclosure should not deviate from the spirit and scope of the technical solutions of the embodiments of the present disclosure.

What is claimed is:

1. A leaky coaxial cable, comprising: an inner conductor, a first insulating dielectric layer, an intermediate conductor, a second insulating dielectric layer and an outer conductor arranged from the inside to the outside in proper order, wherein the inner conductor, the intermediate conductor and the outer conductor are coaxially arranged, wherein the first insulating dielectric layer is configured to insulate the inner conductor and the intermediate conductor arranged adjacently and coaxially, the second insulating dielectric layer is configured to insulate the intermediate conductor and the outer conductor arranged adjacently and coaxially, periodically slotted holes are opened on several length segments of the outer conductor, the intermediate conductor and the outer conductor construct a leaky transmission channel, and the inner conductor and the intermediate conductor construct a feeder transmission channel, wherein the feeder transmission channel is configured to transmit or receive a first signal, the leaky transmission channel is configured to transmit or receive a second signal, the first signal and the second signal pass through the feeder transmission channel and the leaky transmission channel respectively for multiple input multiple output.

2. The leaky coaxial cable according to claim 1, wherein the periodically slotted holes are opened on the entire outer conductor, or the periodically slotted holes are opened on the outer conductor at intervals, or different periodically slotted holes are opened on the outer conductor at intervals.

3. The leaky coaxial cable according to claim 1, wherein the inner conductor is hollow or solid.

4. The leaky coaxial cable according to claim 1, wherein a ratio of an inner diameter of the outer conductor to an outer diameter of the intermediate conductor is a, and a ratio of an inner diameter of the intermediate conductor to an outer diameter of the inner conductor is b, wherein $1.5 \leq a \leq 20$, $1.5 \leq b \leq 20$.

5. The leaky coaxial cable according to claim 1, wherein a protective sheath is arranged on an outside of the outer conductor, and an inner diameter of the outer conductor is 9 mm~50 mm.

6. An indoor distribution system, comprising: a multi-channel signal source at an end of the system, a terminal antenna at another end of the system, and the leaky coaxial cable according to claim 1 connecting the multi-channel signal source and the terminal antenna, wherein the multi-channel signal source comprises a first signal and a second signal which are connected to the leaky coaxial cable for transmission, the terminal antenna is connected at an end of the leaky coaxial cable remote from the multi-channel signal source, the terminal antenna is a dual polarization antenna: the feeder transmission channel constructed in the leaky coaxial cable enables transmission or reception of the first signal through the terminal antenna: the leaky transmission channel constructed in the leaky coaxial cable transmits with the terminal antenna as a load, and enables transmission or reception of the second signal through the slotted holes and the terminal antenna, the first signal and the second signal pass through the feeder transmission channel and the leaky transmission channel respectively for indoor multiple input multiple output.

7. The indoor distribution system according to claim 6, comprising: two or more leaky coaxial cables connected in parallel and/or in series, and several terminal antennas connected remote from the multi-channel signal source.

8. The indoor distribution system according to claim 7, wherein when the slotted holes opened on the two or more leaky coaxial cables are of a same polarization and the two or more leaky coaxial cables transmit a same signal side by side, a distance between two adjacent leaky coaxial cables is at least 10 cm.

9. The indoor distribution system according to claim 7, wherein a protective sheath is arranged on an outside of the outer conductor; when the slotted holes opened on the two or more leaky coaxial cables are of different polarizations, the two leaky coaxial cables are capable of being integrated into one sheath.

10. The indoor distribution system according to claim 7, wherein two or more feeder transmission channels are connected through a first power divider/coupler; two or more leaky transmission channels are connected through a jumper wire or a second power divider/coupler.

11. The indoor distribution system according to claim 10, wherein the first power divider/coupler is connected with an antenna, the feeder transmission channel near the multi-channel signal source side transmits or receives the first signal through the antenna.

12. The indoor distribution system according to claim 6, wherein the multi-channel signal source is connected to several combiners, each combiner is connected to a coupler, and each coupler is connected to the leaky coaxial cable.

* * * * *